C. H. HERSEY.
DRYING AND COOLING APPARATUS.
No. 189,625. Patented April 17, 1877.
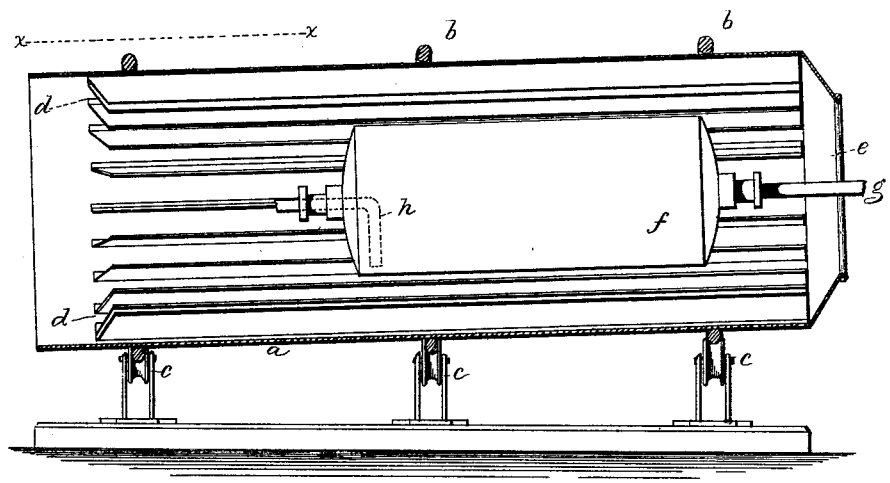
Witnesses.
L. H. Latimer.
W. J. Pratt.
Inventor:
Charles H. Hersey
per Crosby & Gregory
Att'ys.

UNITED STATES PATENT OFFICE.

CHARLES H. HERSEY, OF BOSTON, MASSACHUSETTS, ASSIGNOR TO HIMSELF AND FRANCIS C. HERSEY, OF SAME PLACE.

IMPROVEMENT IN DRYING AND COOLING APPARATUS.

Specification forming part of Letters Patent No. 189,625, dated April 17, 1877; application filed March 23, 1877.

*To all whom it may concern:*

Be it known that I, CHARLES H. HERSEY, of Boston, in the county of Suffolk and State of Massachusetts, have invented an Improvement in Drying and Cooling Apparatus, of which the following is a specification:

This invention relates to improvements in apparatus for drying sugar, grain, &c.; and consists in a drier, constructed, as hereinafter described, to serve the purposes of a cooler, so that the material discharged from the drier may be discharged cool, instead of hot, as is the case with driers as heretofore constructed, so far as I am aware.

In a drier invented by me and patented—No. 114,137—I have shown and described a drying apparatus consisting of a hollow rotating cylinder combined with a centrally-placed steam-heated drying-cylinder. The outer cylinder has within it a series of blades or buckets, to take up the material fed into the upper or induction end of the cylinder and let it fall upon the drying-cylinder, the inclination of the cylinder causing the material to be fed gradually toward the lower or delivery end of the apparatus.

In that machine the material is delivered hot or quite warm, and, in the case of sugar, is sometimes so moist and warm as to cake in the barrels, and to so heat the barrels as to change their shape.

In the use of the apparatus with grain, the latter is delivered too hot to be stored without fear of its becoming musty.

In this my present invention I extend the outer cylinder to a considerable distance beyond the end of the drying-cylinder, thereby affording ample space to cool the sugar, grain, &c., between its passage from the drying-cylinder to the discharging end of the outer cylinder.

As the material in a moist state enters the receiving end of the apparatus it is rapidly dried thereby, as usual in my patent before referred to; but, instead of being discharged while yet hot, it is carried along the cooling or lower end of the cylinder, prolonged to such a distance beyond the influence of the drying-cylinder as to cause the material, sugar, grain, &c., being lifted and let fall beyond the drying-cylinder, to be cooled by the cold air entering the lower end of the apparatus. Such cold air entering the lower end of the cylinder exerts the greatest cooling effect upon the sugar or grain just as it is ready to be discharged, and as such air approaches the drying-cylinder it is heated and dried by the passing grain, enabling it to continue to take up moisture and to act as a drying medium.

The drawing represents my improved drying and cooling apparatus in longitudinal section.

The outer cylinder $a$, provided with curved tracks $b$, is mounted in an inclined position, and so as to rotate upon its sustaining-sheaves $c$. Inside the cylinder is arranged a series of buckets, $d$, adapted to lift the sugar or grain or other thing to be dried and cooled from end to end of the apparatus. The material entered at the receiving end $e$, it falling thereinto from a suitable hopper or chute, is lifted and let fall upon the drying-cylinder $f$, provided with a steam-inlet, $g$, and a steam-discharge, $h$, arranged to also receive water of condensation. That portion of the outer cylinder between the points $x$ $x$ is employed for cooling the material dried by the drying-cylinder, the cylinder $a$ being sufficiently prolonged to retain the material long enough to cool it. The drying-cylinder is constructed and sustained within the outer cylinder, substantially as described in my earlier patent, but in this instance I do not deem the blades and balls therein shown within the cylinder as necessary.

This apparatus is specially advantageous in drying and cooling sugar and grain, so that they may be at once placed within their proper receptacles, without fear of injury by reason of heat.

The most approved size of this my apparatus is as follows:

Length of outer cylinder, thirty-five feet; diameter, six feet; length of inner cylinder, twenty feet; and diameter, three feet.

I claim—

The drying and cooling apparatus, substantially as herein described, consisting of an interior-heated drying-cylinder, *f*, and a surrounding-cylinder, *a*, provided with buckets, and of such length, substantially as described, as to permit the material passing beyond the end of the drying-cylinder toward the discharging end of the outer cylinder to become cooled before it is discharged therefrom, all substantially as described.

In testimony whereof I have signed my name to this specification in the presence of two subscribing witnesses.

CHAS. H. HERSEY.

Witnesses:
 JOHN T. KENNERK,
 W. J. PRATT.